United States Patent
Hwang

[11] Patent Number: 6,104,528
[45] Date of Patent: Aug. 15, 2000

[54] OPTICAL FIBER AMPLIFIER FOR ACHIEVING HIGH GAIN OF SMALL SIGNAL

[75] Inventor: Seong-teak Hwang, Kyungki-do, Rep. of Korea

[73] Assignee: Samsung Electronics Co., Ltd., Kyungki-do, Rep. of Korea

[21] Appl. No.: 09/106,843

[22] Filed: Jun. 30, 1998

[30] Foreign Application Priority Data

Jul. 3, 1997 [KR] Rep. of Korea ........................ 97-30823

[51] Int. Cl.[7] ........................................................ H01S 3/00
[52] U.S. Cl. ................................................................ 359/341
[58] Field of Search .............................................. 359/341

[56] References Cited

U.S. PATENT DOCUMENTS

| | | | |
|---|---|---|---|
| 4,839,898 | 6/1989 | Payne et al. | 372/6 |
| 5,481,391 | 1/1996 | Giles | 359/179 |
| 5,598,294 | 1/1997 | Uno et al. | 359/341 |
| 5,757,541 | 5/1998 | Fidric | 359/341 |
| 5,878,071 | 3/1999 | Delavaux | 372/94 |
| 5,912,750 | 6/1999 | Takeda et al. | 359/124 |

FOREIGN PATENT DOCUMENTS

| | | |
|---|---|---|
| 429123 | 1/1992 | Japan . |
| 4188777 | 7/1992 | Japan . |
| 529686 | 2/1993 | Japan . |
| 7245439 | 9/1995 | Japan . |
| 7270616 | 10/1995 | Japan . |
| 08097491 | 4/1996 | Japan . |
| 897491 | 4/1996 | Japan . |
| 10107352 | 4/1998 | Japan . |
| 10294510 | 11/1998 | Japan . |
| 2304229 | 3/1997 | United Kingdom . |

OTHER PUBLICATIONS

Yoshida et al., "Femtosecond Erbium–Doped Fiber Lasers and a Soliton Compression Technique", Jpn. J. Appl. Phys., vol. 32 (1993) pp. 3461–3466, Part 1, No. 8.

Cai et al., "Equalization of Nonuniform EDFA Gain Using a Fiber–Loop Mirror", IEEE Photonics Technology Letters, vol. 9, No. 7, Jul. 1997, pp. 916–918.

Dennis et al., "High Repetition Rate Figure Eight Laser with Extracavity Feedback", Electronics Letters, Sep. 24, 1992, vol. 28, No. 20, pp. 18941896.

*Primary Examiner*—Mark Hellner
*Attorney, Agent, or Firm*—Leydig, Voit & Mayer

[57] ABSTRACT

An optical fiber amplifier for achieving high gain of a small signal, including a pump laser diode (LD) for applying pumping light to amplify weak incident signal light, a wavelength division multiplexer (WDM) for coupling the incident signal light and the pumping light output from the pump LD into an optical fiber, a fiber amplification medium for amplifying the incident light signal output from the WDM using the pumping light of the pump LD, and for amplifying a feedback signal light reentering the fiber amplification medium from a coupler, a coupler with a loop mirror, for reflecting the incident signal light which has already been amplified by the fiber amplification medium in a loop and sending the reflected signal light back to the fiber amplification medium, and a circulator in front of the WDM, for receiving weak incident signal light and transmitting the weak incident signal light to the WDM, and outputting the feedback signal light, amplified by the fiber amplification medium and passed through the WDM. Therefore, high gain of a small signal can be achieved in the entire wavelength range between 1530 nm and 1560 nm, and the difference in gain between wavelengths can be remarkably narrowed compared to an existing method using an EDF having the same length as the EDF used in the optical fiber amplifier.

10 Claims, 2 Drawing Sheets

OPTICAL FIBER AMPLIFIER FOR ACHIEVING HIGH GAIN OF SMALL SIGNAL

BACKGROUND OF THE INVENTION

1. Field of the Invention

The present invention relates to an optical fiber amplifier, and more particularly, to an optical fiber amplifier with improved small signal gain and having a low luminous intensity by connecting an optical coupler in the form of a loop mirror.

2. Description of the Related Art

In a general repeater for long distance communications, a conventional optical communications repetition is performed in such a manner that a weakened light signal is transformed into an electrical signal, the electrical signal is amplified, and then this amplified electrical signal is transformed back into a light signal. Such a repeating method excessively increases the size of a repeating amplifier system and varies with transmission speed. An optical fiber amplifier for amplifying an optical signal is required as a repeater to overcome the above problem and effectively amplify an optical signal.

An erbium doped fiber amplifier (EDFA) as such a fiber amplification repeater is attracting attention as a next-generation optical repeater for optical communications. The EDFA periodically amplifies an optical signal to prevent attenuation of the optical signal due to long distance transmission, when much data is transmitted over a long distance through an optical fiber.

FIG. 1 is a block diagram showing the configuration of a normal single forward EDFA comprising an erbium doped fiber (EDF) 130 being an optical signal amplifying medium, a pump laser diode (LD) 120, a wavelength division multiplexer (WDM) 110, and isolators 100 and 140. Here, the pump LD 120 functions as a light source for exciting erbium ions in a ground state in the EDF 130. The WDM 110 couples signal light and pump light of different wavelengths to an optical fiber. The isolators 100 and 140 prevent an optical signal from proceeding backward.

The WDM 110 couples signal light and pump light into a fiber and are transmitted in the fiber to the EDF 130. The optical isolator 100 before the WDM 110 prevents the optical signal from being amplified inefficiently by amplified spontaneous emission (ASE), generated by the EDF 130, which is reflected by an optical device, such as a signal input connector, and reenters the EDF 130. Similarly, the isolator 140 after the EDF 130 prevents the amplification efficiency of the EDFA from being degraded due to ASE which is reflected by an optical device, such as a signal output connector, and is again incident upon the EDF 130. The pump LD 120 has a wavelength of 980 nm, pumps laser forward (i.e., in the direction the signal light proceeds), and generates a fixed power of 120 mW. The EDF 130 is an EDF doped with aluminum, and the erbium concentration is 290 ppm.

Meanwhile, the optical fiber amplifier transforms pump light energy into signal light energy using the principles of a laser. Accordingly, when the intensity of the signal light is sufficiently low, the normal optical fiber amplifier cannot effectively change the erbium sufficiently excited by a pump light of high intensity into a ground state, since the signal light passes through the EDF once. Thus, the amplification efficiency of the general optical fiber amplifier is not high. That is, the energy of the pump light cannot be effectively transformed into the energy of the signal light. Therefore, there is a limit in increasing the gain of a small signal, and the difference in gain between the wavelengths of the signal light is comparatively wide.

SUMMARY OF THE INVENTION

To solve these problems, it is an objective of the present invention to provide an erbium doped fiber amplifier (EDFA) for achieving high gain of a small signal, including an optical coupler behind an EDF in the form of a loop mirror, for again amplifying a signal light output via the loop mirror using the EDF and finally outputting the amplified signal light using an optical circulator, in order to increase the gain of a small signal in the entire wavelength range of the EDFA and reduce the difference in gain between the wavelengths of the signal light.

Accordingly, to achieve the above objective, there is provided an optical fiber amplifier for achieving high gain of a small signal, which amplifies a weak incident signal light, comprising: a pump laser diode (LD) for applying a pumping light to amplify the incident signal light; a wavelength division multiplexer (WDM) for coupling the incident signal light and the pumping light output from the pump LD into an optical fiber; a fiber amplification medium for amplifying the incident light signal output from the WDM using the pumping light of the pump LD, and also a feedback signal light reentering the fiber amplification medium from a coupler; a coupler attached in the form of a loop mirror, for reflecting the incident signal light, which has already been amplified by the fiber amplification medium, in a loop shape and sending the reflected signal light back to the fiber amplification medium; and a circulator placed in front of the WDM, for receiving the weak incident signal light and transmitting the weak incident signal light to the WDM, and outputting the feedback signal light, amplified by the fiber amplification medium and passed through the WDM.

It is preferable that the optical fiber amplifier further comprises a filter installed in the coupler functioning as a loop mirror or between the fiber amplification medium and the coupler, for preventing amplified spontaneous emission (ASE) to obtain higher gain of a small signal.

Also, preferably, the optical fiber amplifier further comprises a gain equalizer installed in the coupler functioning as a loop mirror or between the fiber amplification medium and the coupler, for equalizing the gains of the optical fiber amplifier.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 2:
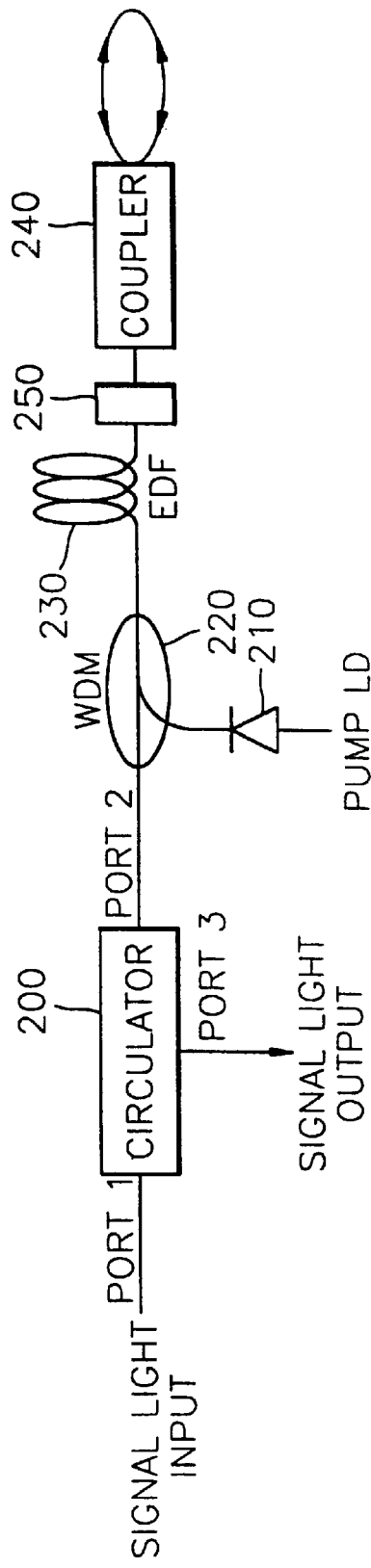
FIG. 2 is a block diagram illustrating the configuration of an optical fiber amplifier for achieving high gain of a small signal, according to an embodiment of the present invention.

Referring to FIG. 2, an optical fiber amplifier for achieving high gain of a small signal according to an embodiment of the present invention comprises a pump laser diode (LD) 210, a wavelength division multiplexer (WDM) 220, an erbium doped fiber (EDF) 230, a coupler 240 and a circulator 200.

The pump LD 210 applies pumping light, a source for exciting erbium ions in a ground state in the EDF, an amplifying medium, in order to amplify an input signal light of low intensity.

The WDM 220 couples the input signal light and the pumping light output from the pump LD 210 into one optical fiber, and applies the coupled input signal light to the EDF 230.

The EDF 230 amplifies the input signal light from the WDM 220 using the pumping light of the pump LD 210, and also amplifies a feedback signal light reentering the EDF 230 from the coupler 240.

The coupler 240, as a 1550 nm 50:50 coupler, is attached in the form of a loop mirror and reflects the incident signal light, which has already been amplified by passing through the EDF 230, to the EDF 230 in a loop shape.

The circulator 200 is placed in front of the WDM 220 and receives the incident signal light of low intensity and transmits it to the WDM 220, and finally outputs the feedback signal light amplified by the EDF 230 and passed through the WDM 220.

The ports 1 and 2 of the circulator 200 transmit the input signal light, and the ports 2 and 3 transmit the output signal light. The insertion losses of the former and the latter are 1.2 dB and 1.73 dB, respectively. The ports 2→1 and ports 3→2 each have an isolation of 40 dB or higher, and serve as an isolator used as input and output ports in a conventional EDFA. Accordingly, there is no need to use an additional isolator.

Figure 1:
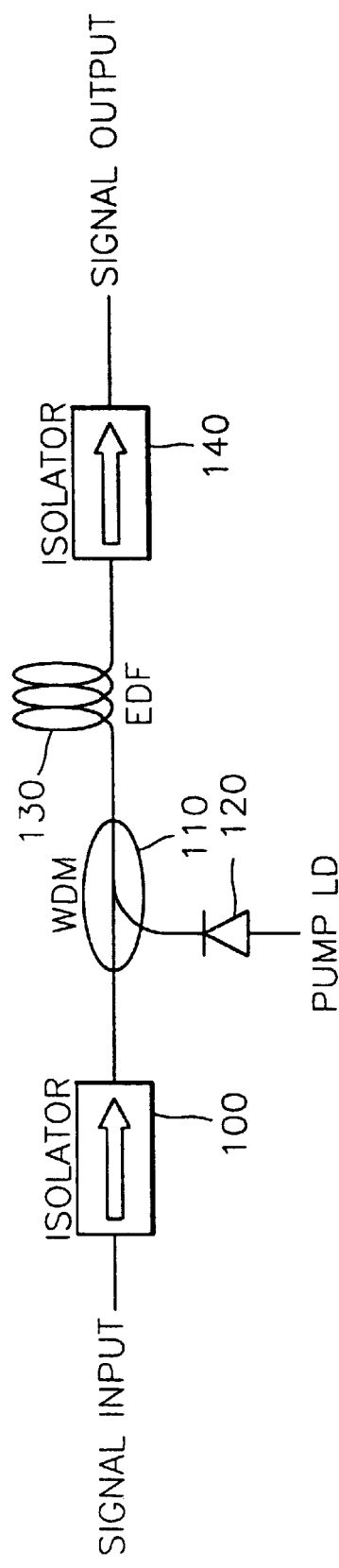
FIG. 1 is a block diagram illustrating the configuration of a conventional single forward erbium doped fiber amplifier (EDFA)

In order to compare the result of the present invention with a conventional single forward EDFA shown in FIG. 1, the pump LD 210 has a wavelength of 980 nm, its power is set to be 120 mW as in the conventional EDFA, and it pumps laser forward, i.e., in the direction the signal light travels. The WDM 220 is a fused type and the used EDF is a 5 m-long high Al-doped EDF having an erbium concentration of 290 ppm.

The operation of the present invention will now be described based on the above-described configuration. First, an incident signal light passes through the ports 1 and 2 of the circulator 200, is coupled with a pump light by the WDM 220, and is primarily amplified by the EDF 230. The amplified signal light is separated in a ratio of 50 to 50, and the separated light signals are coupled to each other in the coupler 240. The signal light fed back via a loop mirror is again amplified by the EDF 230, and the amplified signal light is finally output via the ports 2 and 3 of the circulator 200.

Figure 3:
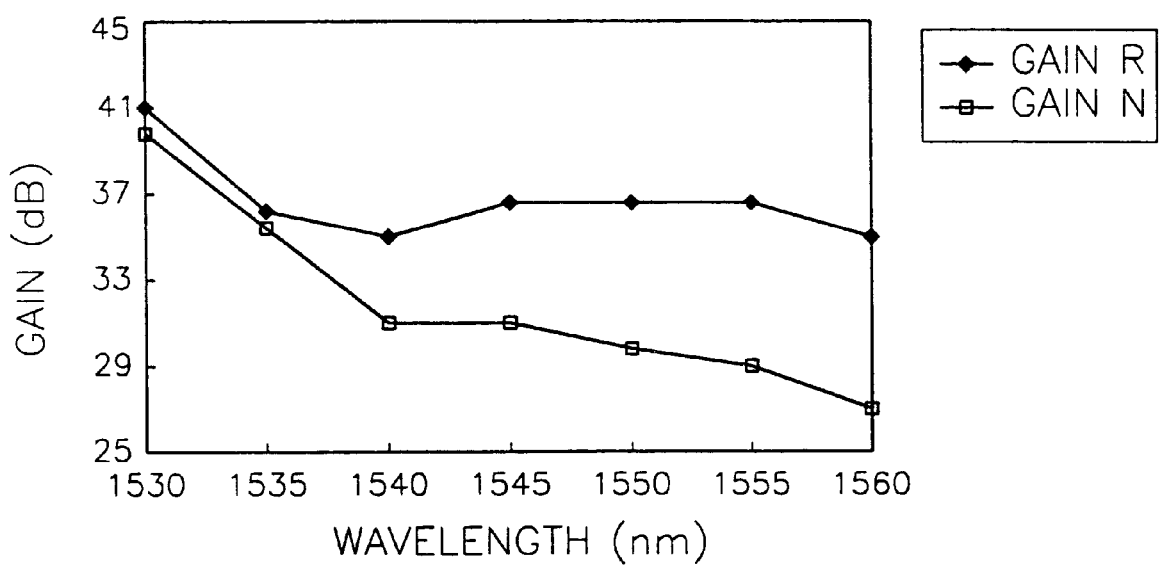
FIG. 3 is a graph illustrating gains according to wavelengths for the comparison of small signal gains of two kinds of EDFAs.

In the present invention, the intensity of the input signal light used to measure the properties of the EDFA is set to be −30 dBm, and the wavelength and intensity of the pump light are respectively set to be 980 nm and 120 mW. An optical device such as the WDM, and the EDF in the present invention are the same as those used in the conventional EDFA, and the two EDFs are the same in length. Gain was measured at intervals of 5 nm in the wavelengths of the input signal light between 1530 nm and 1560 nm, and the result of measurement is shown in FIG. 3 together with the measured gains of the conventional EDFA. As shown in FIG. 3, the EDFA using the loop mirror method has a small signal gain which is higher in wavelengths between 1530 nm and 1560 nm than the conventional single forward EDFA, and the difference in gain according to the wavelengths is small, i.e., between 6 dB and 13 dB. The EDFA according to the present invention achieves a small signal gain which is higher by 7 dB or more, particularly at the wavelength of 1560 nm.

Meanwhile, a filter 250 may be optionally placed in the coupler 240 serving as the loop mirror or between the EDF 230 and the coupler 240, to achieve higher small signal gain by preventing ASE. Also, a gain equalizer (not shown) can be installed in the coupler 240 functioning as the loop mirror or between the fiber amplification medium and the coupler to equalize the gains of the optical fiber amplifier.

According to the present invention, high gain of a small signal can be achieved in the entire wavelength range between 1530 nm and 1560 nm by using the 1550 nm-use 50:50 coupler as the loop mirror.

The difference in gain between wavelengths can be significantly narrower in the EDFA according to the present invention than the conventional EDFA using an EDF having the same length as that of the EDF in the present invention.

The loop mirror method and structure of the EDFA used in the present invention is a double pass method, thus allowing a reduction in the length of the EDF compared with existing single pass methods since a signal light passes through the EDF twice.

Furthermore, since the interval between amplifiers becomes wider with an increase in the gain of the EDFA in long-distance transmission, fewer amplifiers can be used for a given distance. Thus, the loop mirror method according to the present invention is economical and can reduce the probability of errors being generated in the amplifiers.

What is claimed is:

1. An optical fiber amplifier for achieving high gain of a small signal comprising:

a pump laser diode (LD) for applying pumping light to amplify incident signal light;

a wavelength division multiplexer (WDM) for coupling the incident signal light and the pumping light output from the pump LD into an optical fiber;

a fiber amplification medium for amplifying the incident signal light output from the WDM using the pumping light of the pump LD, and feedback signal light reentering the fiber amplification medium from a coupler;

a loop mirror coupler attached to the fiber amplification medium, for reflecting the incident signal light already amplified by the fiber amplification medium, in a loop and sending reflected signal light back to the fiber amplification medium;

a filter in the coupler for suppressing amplified spontaneous emission (ASE) to obtain higher gain; and a circulator in front of the WDM, receiving weak incident signal light and transmitting the incident signal light to the WDM, and outputting the feedback signal light, amplified by the fiber amplification medium, and passed through the WDM.

2. The optical fiber amplifier for achieving high gain of a small signal as claimed in claim 1, comprising a gain equalizer in the coupler for equalizing the gain of the optical fiber amplifier.

3. The optical fiber amplifier for achieving high gain of a small signal as claimed in claim 1, wherein the fiber amplification medium is an erbium doped fiber.

4. The optical fiber amplifier for achieving high gain of a small signal as claimed in claim 1, wherein the coupler is a 1550 nm-use 50:50 coupler.

5. An optical fiber amplifier for achieving high gain of a small signal comprising:
- a pump laser diode (LD) for applying pumping light to amplify incident signal light;
- a wavelength division multiplexer (WDM) for coupling the incident signal light and the pumping light output from the pump LD into an optical fiber;
- a fiber amplification medium for amplifying the incident signal light output from the WDM using the pumping light of the pump LD, and feedback signal light reentering the fiber amplification medium from a coupler;
- a loop mirror coupler attached to the fiber amplification medium, for reflecting the incident signal light already amplified by the fiber amplification medium, in a loop and sending reflected signal light back to the fiber amplification medium;
- a filter located between the fiber amplification medium and the coupler for suppressing amplified spontaneous emission (ASE) to obtain higher gain; and
- a circulator in front of the WDM, receiving weak incident signal light and transmitting the incident signal light to the WDM, and outputting the feedback signal light, amplified by the fiber amplification medium, and passed through the WDM.

6. The optical fiber amplifier for achieving high gain of a small signal as claimed in claim 1, comprising a gain equalizer between the fiber amplification medium and the coupler for equalizing the gain of the optical fiber amplifier.

7. The optical fiber amplifier for achieving high gain of a small signal as claimed in claim 5 comprising a gain equalizer in the coupler for equalizing the gain of the optical fiber amplifier.

8. The optical fiber amplifier for achieving high gain of a small signal as claimed in claim 5, wherein the fiber amplification medium is an erbium doped fiber.

9. The optical fiber amplifier for achieving high gain of a small signal as claimed in claim 5, wherein the coupler is a 1550 nm-use 50:50 coupler.

10. The optical fiber amplifier for achieving high gain of a small signal as claimed in claim 5, comprising a gain equalizer between the fiber amplification medium and the coupler for equalizing the gain of the optical fiber amplifier.

* * * * *